US005855223A

United States Patent [19]
Halonen

[11] Patent Number: 5,855,223
[45] Date of Patent: Jan. 5, 1999

[54] EMPTYING VALVE FOR EMPTYING SEALED LIQUID PACKAGES SUCH AS LIQUID POUCHES

[75] Inventor: Tuomo Halonen, Helsinki, Finland

[73] Assignee: Tuomo Halonen Oy, Toijala, Finland

[21] Appl. No.: 764,363

[22] Filed: Dec. 12, 1996

[51] Int. Cl.[6] ............................ B67B 7/48; B65D 77/40; F16K 51/00

[52] U.S. Cl. .......................... 137/318; 222/83.5; 383/202

[58] Field of Search .............................. 137/318; 222/81, 222/83, 90, 91, 83.5; 383/200, 202, 203

[56] References Cited

U.S. PATENT DOCUMENTS

| | | | |
|---|---|---|---|
| 1,145,778 | 7/1915 | McCrystle | 222/90 |
| 1,169,691 | 1/1916 | St. Elmo | 137/318 |
| 3,269,664 | 8/1966 | Lamb et al. | 137/318 |
| 3,343,724 | 9/1967 | Malpas | 137/318 |
| 3,460,715 | 8/1969 | Lane et al. | 137/318 |
| 3,698,419 | 10/1972 | Tura | 137/318 |
| 3,720,356 | 3/1973 | Mills | 222/569 |
| 3,788,345 | 1/1974 | Tura | 137/318 |
| 4,318,497 | 3/1982 | Freidrich | 222/83 |
| 4,322,018 | 3/1982 | Rutter | 222/83 |
| 5,303,732 | 4/1994 | Jonsson | 137/318 |
| 5,325,995 | 7/1994 | Harrison et al. | 222/81 |
| 5,337,775 | 8/1994 | Lane et al. | 137/318 |

FOREIGN PATENT DOCUMENTS

| | | | |
|---|---|---|---|
| 68027 | 3/1985 | Finland . | |
| 88698 | 11/1989 | Finland . | |
| 282197 | 12/1964 | Netherlands | 137/318 |
| 478693 | 3/1970 | Switzerland . | |
| 960123 | 6/1964 | United Kingdom | 137/318 |

*Primary Examiner*—George L. Walton
*Attorney, Agent, or Firm*—Helfgott & Karas, P.C.

[57] ABSTRACT

An emptying valve for emptying liquid packages such as sealed liquid pouches, said emptying valve being detachably attachable to the sealed liquid pouch, and said emptying valve having an essentially tubular, mainly hollow and at least one end open body piece, whose that end which is to be attached to the liquid pouch is provided at its distal end with a sharply pointed, liquid pouch wall (13) piercing, at least partially conical tip part (2, 4) having liquid-conducting holes (12) made to its wall, whereby the holes communicate with the hollow interior of said tubular body piece, and at least immediately after the tip part (2, 4) the diameter of the tubular body piece (1) being provided with an outer thread after the tip part (2, 4), whereby a tightening element 97) with a mating inner thread can be rotated thereon so as to tighten the element against the collar.

5 Claims, 1 Drawing Sheet

EMPTYING VALVE FOR EMPTYING SEALED LIQUID PACKAGES SUCH AS LIQUID POUCHES

The present invention relates to an emptying valve for emptying sealed liquid packages such as liquid pouches.

Sealed liquid pouches made from a plastic are conventionally used for packaging and dispensing liquid materials including water, milk, cream, yogurt and others. Such plastic pouches are manufactured in purpose-designed packaging machines in which the pouch manufacturing step is also complemented with the filling step of the pouch with the desired liquid. As exiting from the packaging line, the pouch is hermetically sealed. Typically, the pouches are manufactured in the volume range of 0.2–20 liters. The emptying of smaller-volume pouches causes no problems as they are have a low weight and can thus be easily poured into a mug, glass, onto a plate, etc. By contrast, the larger-volume liquid pouches (5–20 liters) principally used in institutional kitchens or similar places require special arrangements for their handling and particularly in the dispensing of the contents.

A method of dispensing the contents of large-volume pouches is to place the pouch in a support frame or similar casing with dimensions matching those of the pouch and to cut a hole in the corner of the pouch wherefrom the liquid may run by gravity into a dispensing apparatus for further use. However, this arrangement is rather awkward in practice and requires complicated and expensive dispensing systems.

Another possibility is to heat-seal a valve and tail of dispensing tubing or similar element to the pouch already during its manufacture. Emptying by these means is a functional and user-friendly solution as such, while also quite costly.

It is an object of the present invention to achieve an emptying method of sealed liquid pouches capable of overcoming the above-mentioned drawbacks. The emptying valve according to the invention is characterized in that:

the emptying valve is detachably attachable to the sealed liquid pouch;

the emptying valve has an essentially tubular, mainly hollow and at at least one end open body piece, whose that end which is to be attached to the sealed liquid pouch is provided at its distal end with a sharply pointed, liquid pouch wall piercing, at least partially conical tip part having liquid-conducting holes made to its wall, whereby the holes communicate with the hollow interior of said tubular body piece;

at least immediately after the tip part, the diameter of the tubular body piece is smaller than the maximum diameter of the body piece, whereby a collar is formed after the tip part; and the outer surface of the tubular body piece is provided with an outer thread after the tip part, whereby a tightening element with a mating inner thread can be rotated thereon so as to tighten the element against said collar of the body piece.

An embodiment of the emptying valve according to the invention is characterized in that tapering angle of the tip part is in the range 10°–70°, most advantageously approx. 35°–45°.

Another embodiment of the emptying valve according to the invention is characterized in that the tip part prior to the collar is cylindrical so that the diameter of the cylindrical section is essentially equal to the maximum diameter of the conical tip part and that the holes communicating with the hollow interior are located in said cylindrical section.

A still another embodiment of the emptying valve according to the invention is characterized in that the tightening element comprises a threaded rotatable member and a bushing member adapted thereto in a freely rotating manner, said bushing member being located between said rotatable member and said collar of said tip part.

By virtue of the present invention, sealed liquid pouches can be manufactured without a permanently attached emptying valve, whereby the use of the pouches becomes essentially more cost-effective.

In the following the invention is described in greater detail with the help of the annexed drawings in which FIG. 1 shows the emptying valve according to the invention with the emptying tubing attached thereto and the cross section of the liquid pouch wall material having the tip part of the valve pierced through the wall;

Figure 1:
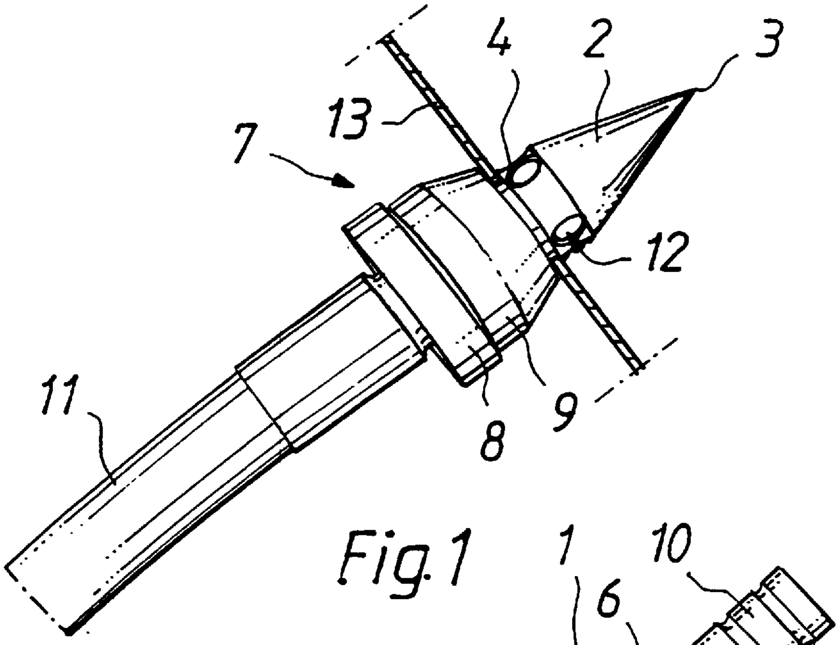
Figure 2:
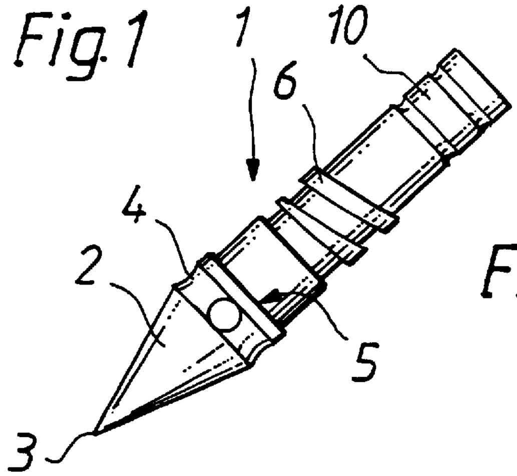
FIG. 2 shows a side view of the tubular body piece of the emptying valve.
Figure 3:
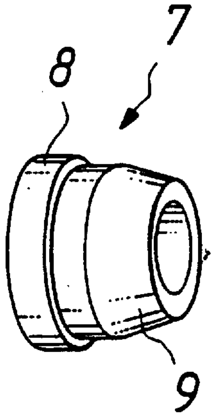
FIG. 3 shows a side view of the tightening element of the emptying valve.
Figure 4:
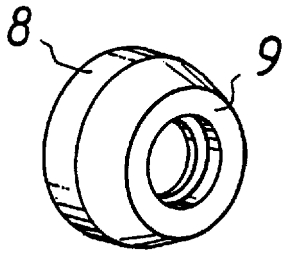
FIG. 4 shows an end view of the tightening element.

Referring to FIG. 1, the entire construction of the emptying valve according to the invention for liquid packages, most advantageously sealed liquid pouches, is illustrated. The valve comprises a tubular and at least partially hollow body piece 1 (FIG. 2), whose one end is provided with a sharply pointed tip part 2, The tip part 2 is essentially conical so that tapering angle of the tip is in the range 10°–70°, most advantageously 35°–45°, and in the described embodiment approx. 40°. The tip part is obviously made so that the sharp tip 3 tapers away from the tubular body piece 1. Next to the conical section in the tip part is a cylindrical section 4 whose diameter is essentially equal to the maximum diameter of the conical tip part and the wall of the cylindrical section is provided with radial holes 12, e.g., four holes, mutually spaced at equal distances about the perimeter of the wall, said holes 12 being adapted to communicate with the hollow interior of the tubular body piece. Following the cylindrical section, the diameter of the tubular body piece is made smaller so that a collar 5 is formed after the tip part. Next, the outer surface of the tubular body piece is provided with a thread 6 onto which a tightening element 7 with a mating inner thread is screwed. The tightening element 7 comprises a rotatable member 8 and a bushing member 9 adapted thereto in a freely rotating manner. The bushing member 9 may be detachably connected to the rotatable member 8 by, e.g., a snap fit. At the other end (relative to the tip part) of the tubular body piece 1 is a free section for attaching a tubing 11. Then, the tubing can be attached simply by inserting it onto the free section 10 of the tubular body piece. The free section may be provided with beads or knurls to improve the holding of the tubing.

Now referring to FIG. 1, the function of the emptying valve according to the invention is explained. As mentioned in the foregoing, the invention is employed in, e.g., institutional kitchens for emptying large-volume sealed liquid pouches (e.g., 5–20 liters). The material of such liquid pouches today is selected from the group of plastics or other similar materials, advantageously LD polyethylenes, which are at least somewhat elastic.

In an institutional kitchen, the sealed liquid pouch is first placed in the location reserved for the pouch, after which the valve assembled in the fashion of FIG. 1 is mounted with the tip part 2 piercing the wall 13 of the liquid pouch advantageously as close as possible to the lower edge of the liquid pouch. The piercing motion is advantageously made relatively slowly, whereby the sharply pointed tip 3 first severs the pouch wall and the conical section 2 gradually starts to expand the pierced hole larger as the valve is inserted deeper. The valve is pushed so deep that the collar 5 enters past the hole in the pouch wall. Then, the hole can contract by the elastic properties of the pouch wall 13 back to a slightly smaller diameter so as to fit snugly against the collar 5. At this instant, the rotatable member 8 is screwed by, e.g., a thumb-forefinger grip approximately a half-turn, whereby the end surface of the bushing member 9 is tightened against the collar 5 leaving the pouch wall 13 between the collar 5 and the bushing member 9. This operation seals the rim of the hole formed in the pouch wall during the insertion of the valve tip part, and the emptying of the pouch may be started. The liquid contained in the liquid pouch can enter the hollow interior of the tubular body piece of the valve via the holes 12 and therefrom further via the tubing to the desired point of dispensing. To control the flow rate of the liquid, the tubing can be provided with a desired type of cock capable of cutting off the liquid flow. As this facility is obvious to a person versed in the art, its detailed description is omitted herein.

Accordingly, the invention characterized in that the sharply pointed tip part of the valve pierces the pouch wall 13 neatly without tearing the wall. This requirement is fulfilled by combining a proper design of the tip part 2 with a suitable pouch wall material. The pouch wall material must also be somewhat elastic so that the distention caused by the penetrating tip part is at least partially contracted back about the collar 5. Furthermore, it is important for the function of the invention that the bushing member 9 is mounted freely rotatably with respect to the rotatable member 8. Then, the rotation of the rotatable member transmits no torque to the pouch wall material 13, which would cause creasing of the wall and thus results in leaks. In other words, when the rotatable member 8 is screwed tight, the bushing member 9 stays stationary with respect to its perimeter and is moved only axially toward the collar 5 finally sealing the pouch wall 13 about the pierced hole against the collar 5. The pitch of the thread is made so coarse that such tightening can be accomplished by a rotation of a half-turn only. The half-turn rotation is arranged to correspond to, e.g., an axial movement of approx. 4 mm. Then, the tightening of the valve in place can occur with the same hand grip as is used to pierce the pouch wall 13 by the tip part without the need for releasing or altering the hand grip during the piercing/tightening operation.

Obviously, the valve is extremely easy to detach from the liquid pouch. Here, the tightening element 7 is released by unscrewing the rotatable member 8 so that the distance of the bushing member 9 from the collar 5 is increased and the hold of the valve from the pouch wall 13 is loosened. Subsequently, the valve is simply withdrawn from the liquid pouch and can be reused after a possible washing and rinsing.

Suitable materials for the emptying valve are foodstuff-grade plastics or stainless steel. The material should further be selected so that the valve can endure washing in dish-washing machine.

To a person versed in the art it is obvious that the invention is not limited to the exemplary embodiments described above, but rather, can be varied within the scope of the appended claims. Hence, any reference to holes 12 in the foregoing can as well be understood to refer to a single hole alone. The essential requirement is that the liquid can flow from inside the liquid pouch via the valve and a tubing possibly attached thereto to a desired point. The construction of the valve may be varied. For instance, the outer surface of the conical tip part may be provided with a thread to improve the piercing capability of the tip. However, tests performed on conventionally employed liquid pouch materials have shown such a threaded tip part to be less functional than the smooth-surfaced tip part described above.

I claim:

1. An emptying valve for emptying sealed liquid packages such as liquid pouches including a pouch wall (13), the emptying valve being detachably attachable to the sealed liquid pouch, and the emptying valve having an essentially tubular, mainly hollow and at least one end open body piece (1), the emptying valve being attached to the sealed liquid pouch is provided at a distal end with a partially conical tip part (2) having liquid-conducting holes (12), whereby the holes communicate with the hollow interior of the tubular body piece (1) and at least immediately after the tip part (2,4), the diameter of the tubular body piece (1) is smaller than the maximum diameter of the body piece (2,4), a collar (5) is formed after the tip part, characterized in that the tip part (4) prior to the collar (5) is cylindrical so that the diameter of the cylindrical section is essentially equal to the maximum diameter of the conical tip part and that the holes (12) communicating with the hollow interior are located in said cylindrical section (4), wherein fluid flows from the pouch though the holes (12) to the tubular body piece (1) when the tip part (2) pierces an opening in the pouch wall (13) and the holes (12) being disposed within the pouch, a tightening element (7) is disposed over the tubular body piece (1) adjacent to the distal end, wherein a portion of the tightening element (7) abuts the collar (5) holding the pouch wall (13) therebetween in order to seal the opening in the liquid pouch.

2. An emptying valve as defined in claim 1, characterized in that a tapering angle of the tip is in the range 10–70 degrees, most advantageously approximately 35–45 degrees.

3. An emptying valve as defined in claim 1, characterized in that the distal end of the conical tip part is sharply pointed for piercing the liquid pouch.

4. An emptying valve as defined in claim 1, characterized in that the other end of the tubular body piece (1) relative to the tip part (2,4) has an open lumen and an emptying tubing (11) or similar member is attached thereto.

5. An emptying valve as defined in claim 1, wherein the tightening element (7) includes a rotatable member(8) and a bushing member(9).

* * * * *